United States Patent [19]
Bharucha et al.

[11] Patent Number: 6,021,136
[45] Date of Patent: Feb. 1, 2000

[54] TELECOMMUNICATION NETWORK THAT REDUCES TANDEMING OF COMPRESSED VOICE PACKETS

[75] Inventors: Behram H. Bharucha, Millburn; Thomas P. Chu, Englishtown; Seyhan Civanlar, Middletown Township, Monmouth County, all of N.J.

[73] Assignee: AT&T Corp., New York, N.Y.

[21] Appl. No.: 08/903,090

[22] Filed: Jul. 30, 1997

[51] Int. Cl.[7] ............................... H04J 3/18; H04L 12/56
[52] U.S. Cl. ......................... 370/477; 370/466; 370/401; 370/410; 370/236; 370/352; 370/395; 704/501
[58] Field of Search .................... 370/465, 468, 370/477, 271, 466, 260, 235, 236, 410, 352, 331, 395, 522, 521, 401, 268, 225; 704/228

[56] References Cited

U.S. PATENT DOCUMENTS

| | | | |
|---|---|---|---|
| 4,823,342 | 4/1989 | Morita et al. | 370/521 |
| 4,993,014 | 2/1991 | Gordon | 370/225 |
| 5,390,177 | 2/1995 | Nahumi | 370/268 |
| 5,511,074 | 4/1996 | Lam et al. | 370/465 |
| 5,623,491 | 4/1997 | Skoog | 370/397 |
| 5,694,519 | 12/1997 | Chen et al. | 704/228 |
| 5,701,302 | 12/1997 | Geiger | 370/521 |
| 5,764,628 | 6/1998 | Davis et al. | 370/271 |
| 5,850,391 | 12/1998 | Essigmann | 370/331 |
| 5,898,675 | 4/1999 | Nahumi | 370/260 |

FOREIGN PATENT DOCUMENTS

| | | |
|---|---|---|
| 0 332 345 | 9/1989 | European Pat. Off. . |
| 0 705 052 | 3/1996 | European Pat. Off. . |
| 196 45 368 | 4/1998 | Germany . |
| 09261248 | 3/1997 | Japan . |
| 2 253 768 | 9/1992 | United Kingdom . |
| 2 283 154 | 4/1995 | United Kingdom . |
| 2 311 688 | 1/1997 | United Kingdom . |
| WO 95/24802 | 9/1995 | WIPO . |
| WO 96/31993 | 10/1996 | WIPO . |

OTHER PUBLICATIONS

International Search Report, Oct. 10, 1998.
Atul Khanduri et al., "Avoidance of double encoding and decoding in Digital Cellular Network", 1996 IEEE, International Conference on Personal Wireless Comm., Feb. 1996, pp. 272–276.

*Primary Examiner*—Hassan Kizou
*Assistant Examiner*—John Pezzlo
*Attorney, Agent, or Firm*—Kenyon & Kenyon

[57] ABSTRACT

A telecommunication network establishes a telephone call from a first location that generates compressed voice packets to a second location. The telecommunication network includes a plurality of switches, a first interworking function ("IWF") coupled to the first location and coupled to a first switch of the plurality of switches, a second IWF coupled to the second location and coupled to a second switch of the plurality of switches, and a network database coupled to said first switch. When a telephone call is initiated from the first location, the first switch receives signaling information from the first location. The first switch then queries the network database based on the signaling information and determines whether the second location uses compressed voice packets based on the query. Finally, the first switch establishes a connection between the first IWF and the second IWF if it is determined that the second location uses compressed voice packets. The connection bypasses the plurality of switches, and therefore reduces tandeming in the network.

29 Claims, 5 Drawing Sheets

TELECOMMUNICATION NETWORK THAT REDUCES TANDEMING OF COMPRESSED VOICE PACKETS

BACKGROUND OF THE INVENTION

The present invention is directed to data transmission of compressed voice packets. More particularly, the present invention is directed to a telecommunication network that reduces tandeming of compressed voice packets.

Public telephone carriers offer many digital services to which customers can subscribe. Some digital services allow the customer to multiplex multiple telecommunication applications (e.g., a PBX and computer data equipment) located at the customer's premise onto a single access circuit.

One example of a digital service is a T1 circuit. A T1 circuit includes multiple frames, with each frame including twenty-four time slots, and each time slot including eight bits of information. A T1 circuit utilizes synchronous time division multiplexing ("TDM") to multiplex together information from multiple telecommunication applications.

Another example of a digital service is an Asynchronous Transfer Mode ("ATM") circuit. All information in ATM is carried in the form of fixed-length data units called "cells." ATM utilizes a form of multiplexing known as statistical multiplexing ("STM"). With STM, bandwidth is shared among all telecommunication applications, and bandwidth is used by an application only when needed.

Digital services can be used more efficiently if the voice is compressed using one of many known compression techniques. For example, uncompressed voice typically is digitized at a rate of 64 Kbps. Using known methods (e.g., International Telecommunication Union ("ITU") standard G.729 (CS-ACELP) or ITU standard G.723.1 (MP-MLQ)), voice can be compressed to a rate of eight Kbps or below, with very good quality.

Compressed packetized voice can be used in most digital services. For example, compressed packetized voice can be carried over an ATM virtual connection ("VC") as mini-packets using an ATM Adaption Layer-2 ("AAL2") adaption layer. The AAL2 adaption layer is promulgated by ITU standard I.363.2.

Although compressed packetized voice offers many advantages, it does have some disadvantages. For examples, more delays are introduced when using compressed packets. Further, when compressed voice packets undergo a series of compression and decompression, referred to as "tandeming", voice quality rapidly degrades. This is because most voice compression algorithms are not lossless, i.e., the decompressed output speech is not the same as the input speech because some errors are introduced. The errors compound with successive compressions.

FIG. 1 illustrates a telecommunication network in which compressed voice packets are subject to tandeming. In FIG. 1, a compressed voice call takes place between two locations 12 and 14 that both subscribe to the same compressed voice digital access service (i.e., ATM). Each location 12, 14 includes end user equipment 16, 30, and an interworking function ("IWF") 18, 28. An IWF is a device that provides integrated access and voice compression/decompression. In a packet network environment, the IWF typical performs the packet relay function (i.e., the forwarding of packets). IWFs that perform this function are also referred to as a "packet relay switches."

The call between locations 12 and 14 is placed over the Public Switched Telephone Network ("PSTN") 10. PSTN 10 includes a plurality of switches, including switches 22 and 24. Further, because PSTN 10 can only switch uncompressed voice packets, IWFs 20, 26 are placed at the ingress and egress of network 10. IWFs 20, 26 decompress voice packets before the packets are received by switches 22, 24, and compress voice packets before the packets are received by a receiving location.

The call from location 12 to location 14 undergoes two tandems (i.e., compression/decompression): the ingress circuit from location 12 to switch 22 (i.e., compression at IWF 18, decompression at IWF 20); and the egress circuit from switch 24 to location 14 (i.e., compression at IWF 26, decompression at IWF 28). The multiple tandeming results in a degraded voice quality.

In other situations more than two tandems can occur. For example, if a user at location A hosts an audio conference using an audio bridge with users at location B and location C, speech from location B to location C will go through four tandems. Further, if a user at location B leaves an audio voice message at location A which is later retrieved at location C, the original message will go through four tandems.

Because tandeming of compressed voice packets results in a substantial degradation of voice quality, it is desirable to have a telecommunication network that reduces the number of tandems.

SUMMARY OF THE INVENTION

One embodiment of the present invention is a telecommunication network for establishing a telephone call from a first location that generates compressed voice packets to a second location. The telecommunication network includes a plurality of switches, a first interworking function ("IWF") coupled to the first location and coupled to a first switch of the plurality of switches, a second IWF coupled to the second location and coupled to a second switch of the plurality of switches, and a network database coupled to said first switch.

When a telephone call is initiated from the first location, the first switch receives signaling information from the first location. The first switch then queries the network database based on the signaling information and determines whether the second location uses compressed voice packets based on the query. The first switch then establishes a connection between the first IWF and the second IWF if it is determined that the second location uses compressed voice packets. The connection bypasses the plurality of switches, and therefore reduces tandeming in the network.

DETAILED DESCRIPTION

Figure 1:
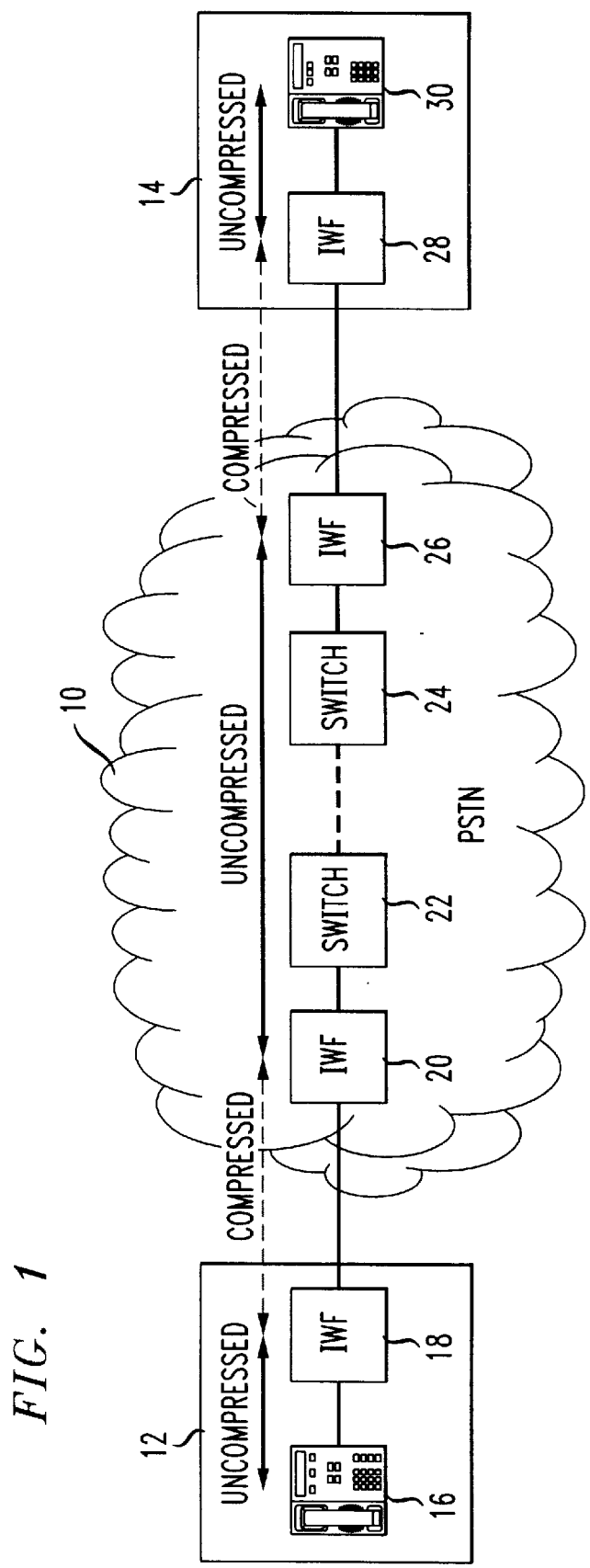
FIG. 1 illustrates a telecommunication network in which compressed voice packets are subject to tandeming.
Figure 2:
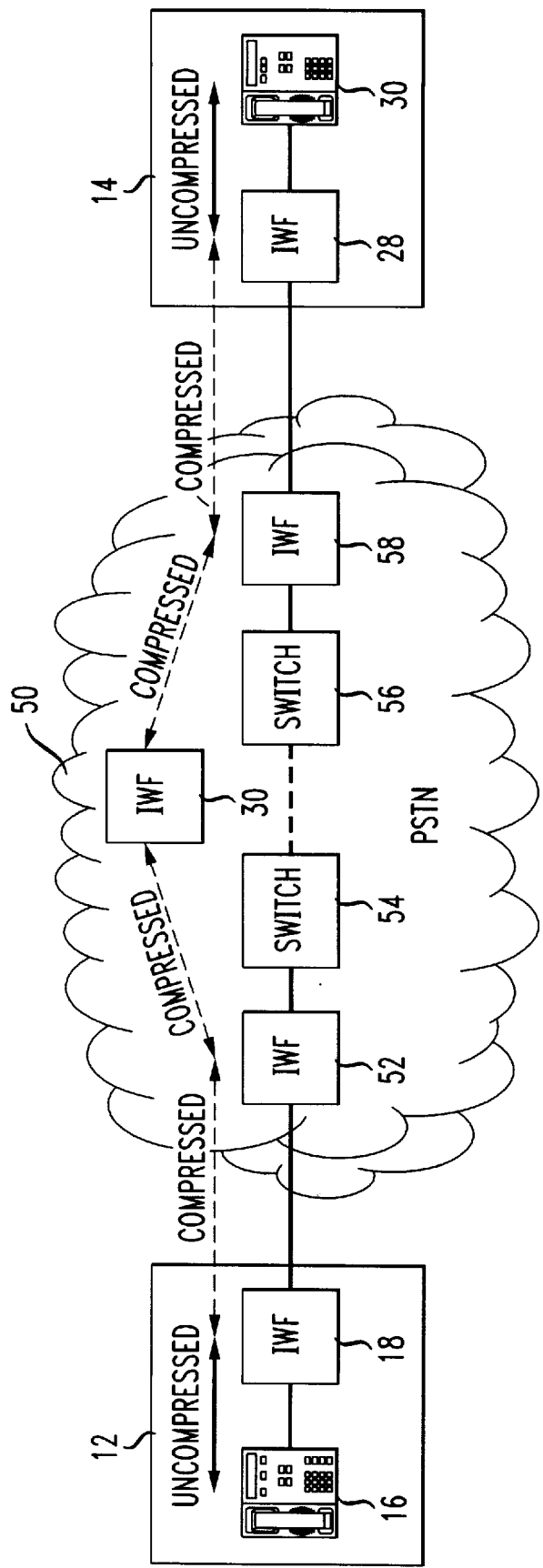
FIG. 2 illustrates a telecommunication network in accordance with one embodiment of the present invention.

FIG. 2 illustrates a telecommunication network in accordance with one embodiment of the present invention. The network 50 in FIG. 2, similar to the network illustrated in FIG. 1, can be part of the PSTN in one embodiment. However, in other embodiments network 50 can be any telecommunications network that switches uncompressed voice packets.

Network 50 includes IWFs 52, 58, 30 and a plurality of network switches 54, 56. Network switches 54, 56 are also referred to as "network nodes" and are known devices within network 50 that are programmed to implement the present invention. One function of IWF 52 is to decompress incoming voice packets and send the voice traffic to switches 54, 56 in network 50, and vice versa.

Locations 12 and 14 subscribe to the same compressed voice digital access service and include end user equipment 16, 30 and IWFs 18, 28. One function of IWFs 18, 28 when transmitting voice from their respective locations is to compress voice traffic into packets and send them to network 50 (and vice versa when receiving compressed voice packets from network 50). In one embodiment, end user equipment 16, 30 is a narrow band Integrated Services Digital Network ("N-ISDN") device. Further, in the embodiment shown in FIG. 2 and in the remaining embodiments described in this section, the access service is ATM.

When a compressed voice call is initiated from location 12 to location 14, network 50 causes the compressed voice packets to bypass all the switches in network 50. This can be done, for example, by establishing an AAL2 channel connection between IWF 52 and IWF 58. The AAL2 channel may pass through additional IWFs such as IWF 30. As a result of the bypass, the compressed voice packets will be sent between IWFs without decompression and compression as was required in the example illustrated in FIG. 1. This reduces the number of tandems in the network to one (i.e., compression at IWF 18, decompression at IWF 28).

Figure 3:
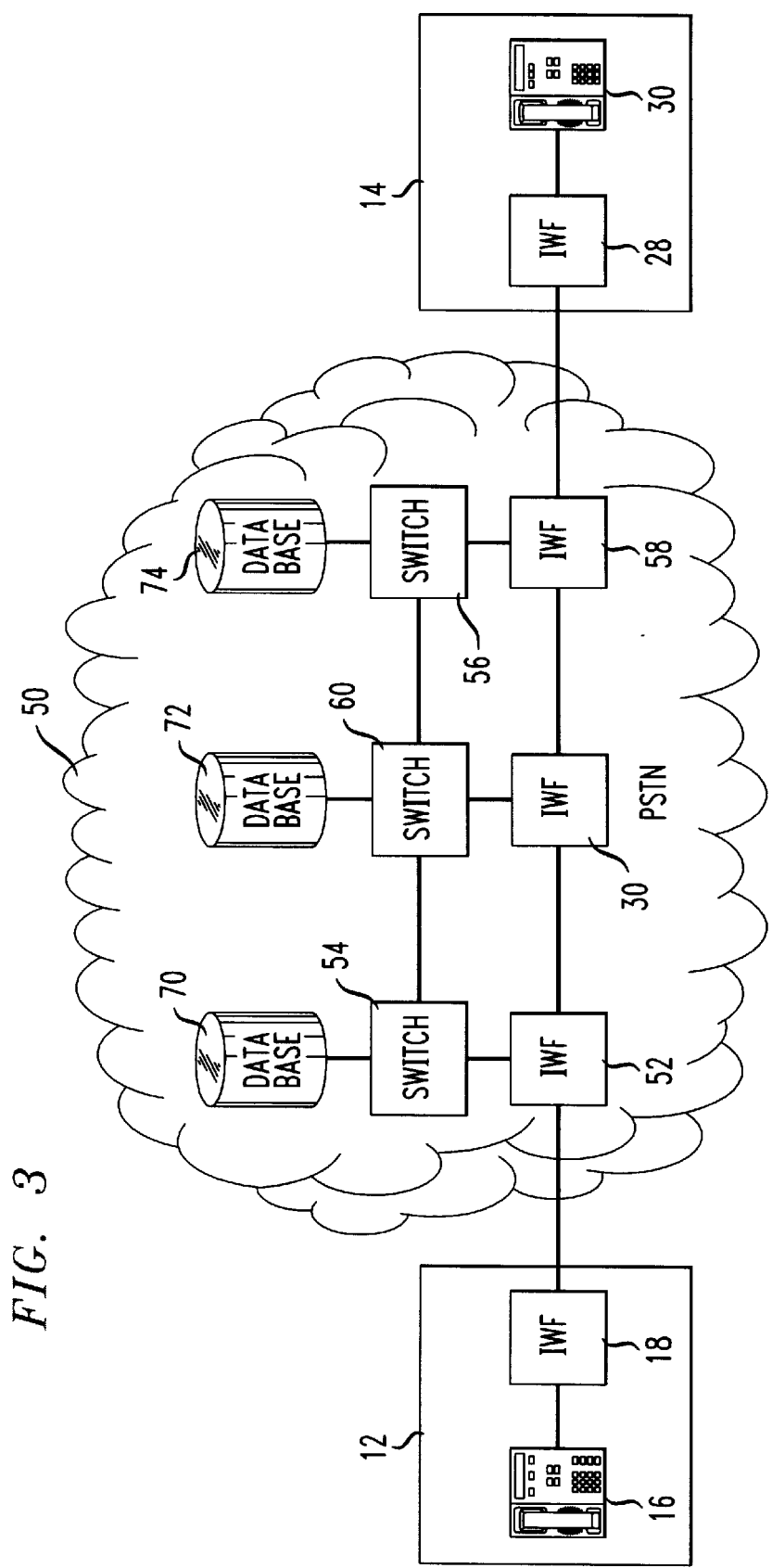
FIG. 3 illustrates in more detail one embodiment of the telecommunication network shown in FIG. 2.

FIG. 3 illustrates in more detail one embodiment of network 50 shown in FIG. 2. In the embodiment shown in FIG. 3, each IWF in network 50 is under the control of a switch. Network 50 includes switches 54, 60, 56. Each switch is coupled to an IWF 52, 30, 58. Each switch is also coupled to a network database 70, 72, 74. A transaction interface exists between the IWFs and the switches. One example of a transaction interface is a "Fabric Application Interface" which is disclosed in U.S. patent application Ser. No. 08/808,298 entitled "Distributed Network Control and Fabric Application Interface" and filed on Feb. 28, 1997.

Figure 4:
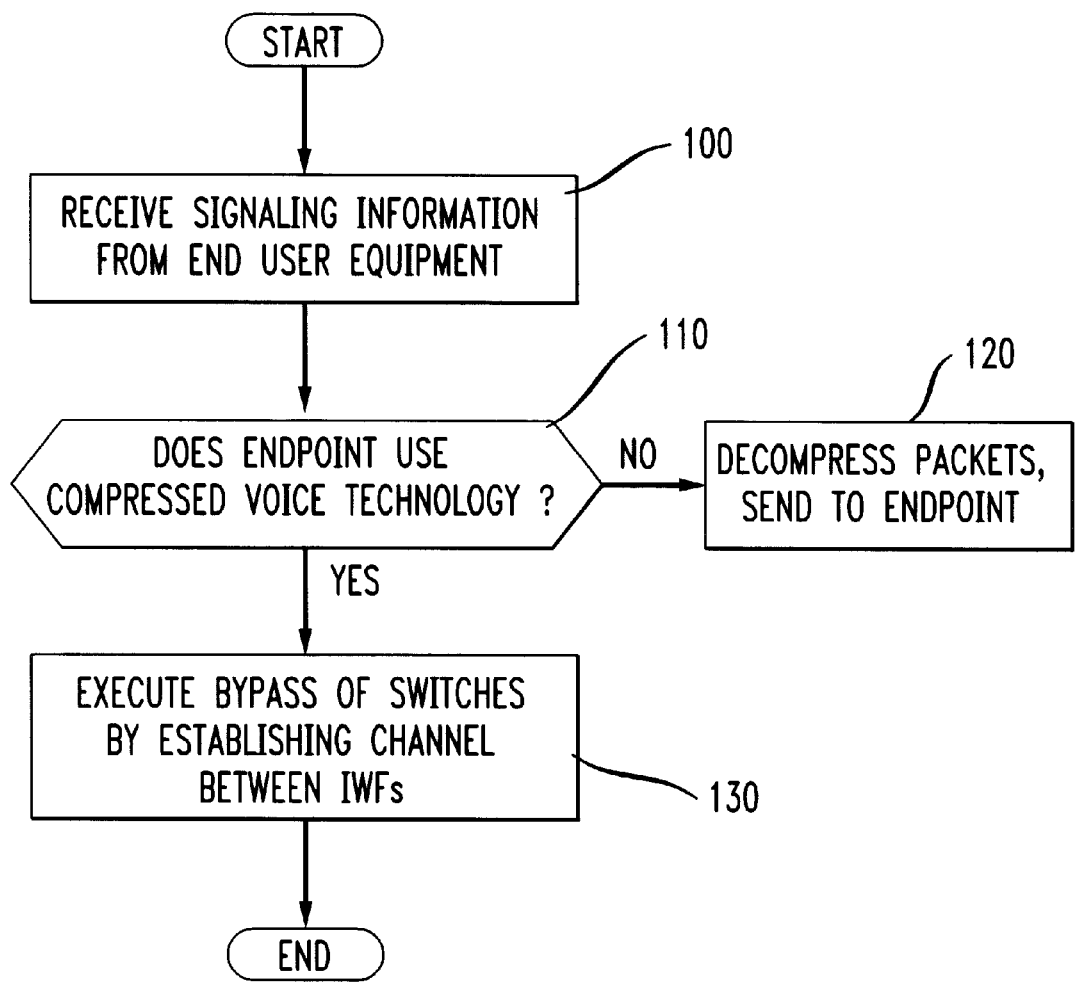
FIG. 4 is a flowchart of the steps performed by the telecommunication network of FIG. 2 when a voice call is initiated.

FIG. 4 is a flowchart of the steps performed by network 50 when a voice call to location 14 is initiated from location 12. The voice call is received by network 50 (i.e., IWF 52) as a compressed ATM voice packet.

At step 100, switch 54 receives a signaling information message from end user equipment 16. All signaling information in one embodiment of the present invention is in accordance with the signaling specifications disclosed in the ITU "Digital Subscriber Signaling System No. 1 (DSS 1) Network Layer, User Network Management, Vol. VI, Recommendation Q.931", (November, 1988). The signaling information received at step 100 is a SETUP message and the signaling information is passed transparently through IWF 18 and IWF 52 to switch 54 in a known manner. Encoded in the message is the ITU E.164 address of location 14 (e.g., 908-555-1212).

At step 110, switch 54 determines whether location 14 (the endpoint of the telephone call) uses compressed voice technology. This determination is done by querying network database 70 which has information on all locations coupled to network 50.

If at step 110 it is determined that location 14 does not use compressed voice, at step 120 switch 54 instructs IWF 52 to decompress the incoming voice packets and the packets are sent to location 14 through switches 54, 56 in the same manner as typical uncompressed voice packets are transmitted through the PSTN.

However, if at step 110 it is determined that location 14 uses compressed voice, at step 130 switch 54 executes a bypass of the switches in network 50. In one embodiment, switch 54 at step 130 will instruct IWF 52 to transfer the voice packets to IWF 58 through an AAL2 channel. The interface between switch 54 and IWF 52 is a message transaction interface.

The message from switch 54 to IWF 52 contains the following: a) the address (e.g., the ATM address if ATM is used) of the next IWF (i.e., IWF 30); b) the E.164 address of the call destination location 14; c) the bandwidth needed for the connection; and d) other characteristics of the connection such as the identity of higher layer protocols.

After IWF 52 receives the message from switch 54 the call flow for the embodiment illustrated in FIG. 3 is as follows:

1. IWF 52 will check whether there is an AAL2 connection between itself and IWF 30 and whether there is available resource for that connection.

2. If there is no connection or resource is not available, IWF 52 will initiate an ATM connection to IWF 30. In establishing this connection, IWF 52 will encode the following information in the SETUP message:

the fact that the call is an AAL2 connection supporting this application;

a label that identifies the connection, assigned by IWF 52; and parameters for initialization.

There are many ways to encode the above information. In one embodiment, the first item is encoded as a Broadband Lower Layer Identifier ("B-LLI") information element ("IE") and the next two items are encoded as a Generic Information Transport ("GIT") IE. Both of these information elements are defined in the ATM signaling standard Q.2931.

3. If IWF 52 fails to establish a connection with IWF 30 it will return a negative response to switch 54 and the call will proceed as normal (i.e., IWF 18 will decompress the packetized voice and pass the traffic to switch 54, etc.).

4. After the AAL2 connection is set up (or one is already available), IWF 52 will reserve a Channel Identifier ("CID"), for example CID 802, of the AAL2 connection.

5. IWF 52 will respond to switch 54 with a positive response informing that CID 802 of an AAL2 connection, for example AAL2 connection 702, has been reserved for this call.

6. From this point on, incoming packets will be switched to CID 802 of AAL2 connection 702.

Upon receipt of the positive response from IWF 52, switch 54 will send an Initial Address Message ("IAM") to switch 60. An IAM is defined by the ITU standard Q.761, commonly referred to as "ISUP, ISDN user part". It specifies the signaling messages between two switches.

The IAM sent to switch 60 informs switch 60 of:

an incoming packet stream for IWF 30 on AAL2 connection 702, CID 802; and the E.164 address of the final destination of the call (i.e., location 14).

The first item is not part of the current IAM message and is required to be specified either as an IE or as a new format of an existing IE.

Upon the receipt of this IAM message, switch 60 will determine the next hop and the process repeats until IWF 58 is reached.

Figure 5:
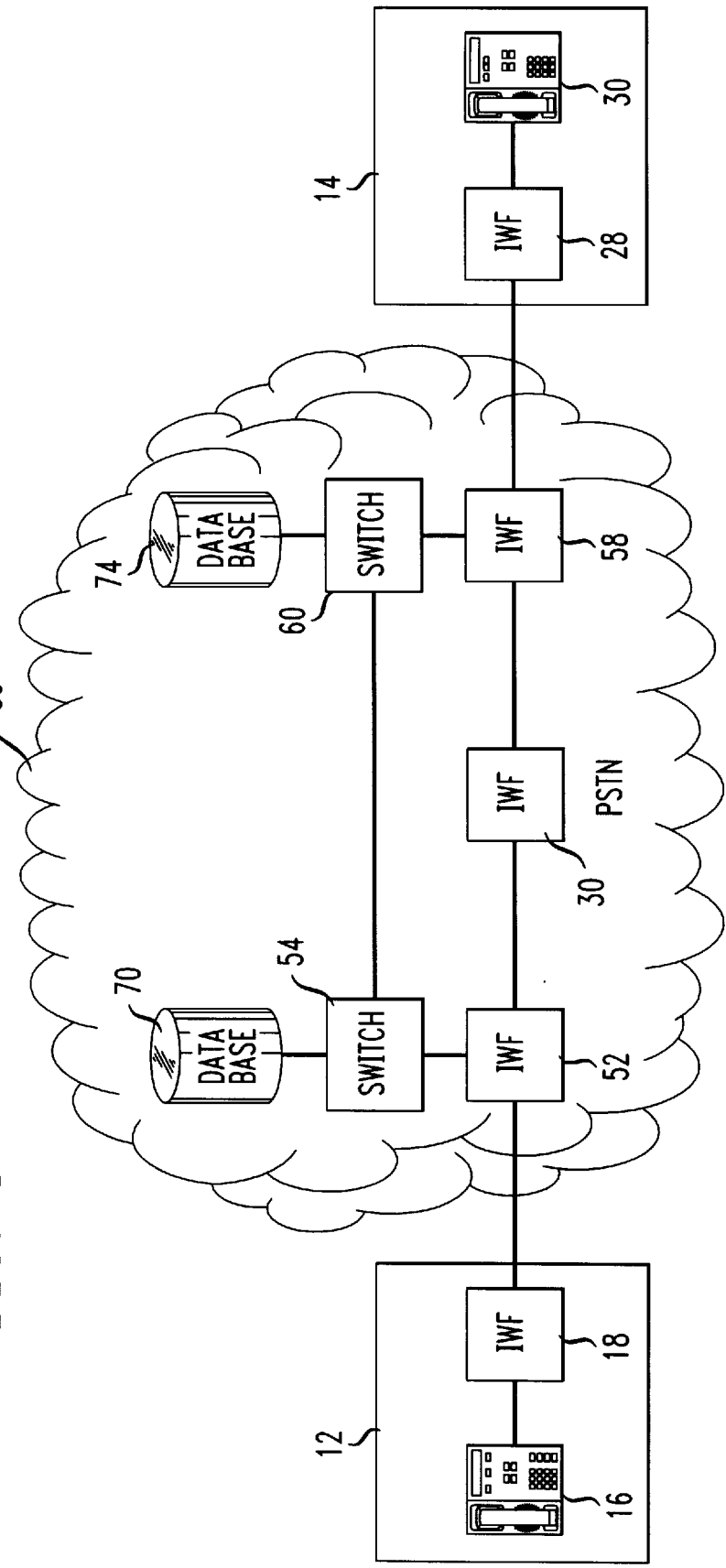
FIG. 5 illustrates in more detail another embodiment of the telecommunication network shown in FIG. 2.

FIG. 5 illustrates in more detail another embodiment of network 50 shown in FIG. 2. In the embodiment shown in FIG. 5, some IWFs (i.e., IWF 30) are not controlled by a switch. The embodiment of network 50 shown in FIG. 5 also executes the steps 100–130 of FIG. 4. However, the call flow after IWF 52 receives the message from switch 54 is different than the embodiment of FIG. 3, and additional functionality is needed at IWFs 52–58.

For example, the IWFs must contain routing information so that the next hop IWF can be determined. This routing can be set up administratively or acquired dynamically using one of the many known routing protocol such as the Open Shortest Path First ("OSPF") as specified by the Internet Engineering Task Force ("IETF").

Connections can be established through the IWFs via signaling messages. One example of signaling messages between IWFs is the ATM Adaptation Negotiation Procedure ("ANP") currently under development in the ITU.

Further, the IWFs must support an AAL2 call control procedure such that a connection path can be established between two IWFs. The path consists of channels within AAL2 connections between the IWFs. The CID may change from one AAL2 connection to another. In establishing the connection, the SETUP message will contain the following information:

the ATM address of the destination IWF;

the E.164 address of location 14;

the bandwidth required for the call;

an identification for the call; and high layer information such as the voice compression algorithms used.

The call flow for the embodiment shown in FIG. 5 is as follows:

1. Switch 54 sends a command to IWF 52 containing the above information.

2. IWF 52 uses the AAL2 call procedure to establish an AAL2 channel connection to the destination IWF 58. This AAL2 channel may span multiple IWFs if necessary. IWF 52 may need to initiate a new AAL2 connection to accomplish this. The procedure for establishing a new AAL2 connection has been previously described in conjunction with FIG. 3.

3. If IWF 52 fails to establish an AAL2 channel connection with IWF 58, it will return a negative response to switch 54 and the call will proceed as normal (i.e., IWF 52 will decompress the packetized voice and pass the traffic to switch 54, etc.).

4. After the AAL2 channel connection is set up, a channel of an AAL2 channel (e.g., CID 805 of AAL2 connection 705) of IWF 52 is allocated to the call.

5. IWF will respond to switch 401 with a positive response informing that CID 805 of AAL2 connection 705 has been allocated for this call.

6. From this point on, incoming packets for this call will be switched to CID 805 of AAL2 connection 705 and vice versa.

It is likely that the egress IWF 58 is controlled by a switch 60 which is used to support outgoing calls from location 14. The following step may be used in this situation:

7. IWF 58 will inform switch 60 of the incoming packetized stream.

As described, the network in accordance with the present invention reduces the tandeming of compressed voice packets by bypassing switches within the network. This results in an improved voice quality for a telephone call between two locations that utilize compressed voice packet technology.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, in the embodiments illustrated the digital access service subscribed to by the each location is ATM. However, each location can also subscribe to another digital access service such as T1 or frame relay services or future developed services such as a service based on the Frame User-Network Interface ("FUNI") that is promulgated by the ATM Forum.

What is claimed is:

1. A telecommunication network for establishing a telephone call from a first location that generates compressed voice packets to a second location, said telecommunication network comprising:

a plurality of network switches;

a first interworking function (IWF) coupled to the first location and coupled to a first network switch of said plurality of network switches;

a second IWF coupled to the second location and coupled to a second network switch of said plurality of network switches; and a network database coupled to said first network switch;

wherein said first network switch is programmed to:

receive signaling information from the first location;

query said network database based on the signaling information;

determine whether the second location uses compressed voice packets based on the query; and establish a connection between said first IWF and said second IWF if it is determined that the second location uses compressed voice packets, wherein said connection bypasses said plurality of network switches.

2. The telecommunication network of claim 1, wherein the telephone call comprises transmitting the compressed voice packets from the first location to the second location on an Asynchronous Transfer Mode (ATM) circuit.

3. The telecommunication network of claim 2, wherein the connection comprises an ATM Adaption Layer-2 (AAL2) channel connection.

4. The telecommunication network of claim 1, wherein said first IWF decompresses voice packets received from the first location if it is determined that the second location does not use compressed voice packets.

5. The telecommunication network of claim 1, wherein said second IWF compresses voice packets received from said second network switch.

6. The telecommunication network of claim 1, wherein said first IWF and said second IWF comprise packet relay switches.

7. The telecommunication network of claim 1, wherein the first location comprises end user equipment and a third IWF coupled to said first IWF.

8. The telecommunication network of claim 1, wherein the connection is a direct connection between said first IWF and said second IWF.

9. The telecommunication network of claim 1, further comprising:

a plurality of IWFs;

wherein the connection is routed through at least one of the plurality of IWFs.

10. The telecommunication network of claim 1, wherein said first IWF is controlled by one of said plurality of network switches and said second IWF is controlled by another one of said plurality of network switches.

11. A method of initiating a telephone call from a first location that generates compressed voice packets to a second location over a telecommunication network that comprises a plurality of network switches and a first and second interworking function (IWF), said method comprising the steps of:

(a) receiving signaling information from the first location;

(b) querying a telecommunication network database based on the signaling information;

(c) determining whether the second location uses compressed voice packets based on the query; and (d) establishing a connection between the first IWF and the second IWF if it is determined that the second location uses compressed voice packets, wherein said connection bypasses the plurality of network switches.

12. The method of claim 11, wherein the telephone call comprises transmitting the compressed voice packets from the first location to the second location on an Asynchronous Transfer Mode (ATM) circuit.

13. The method of claim 12, wherein the connection comprises an ATM Adaption Layer-2 (AAL2) channel connection.

14. The method of claim 11, wherein the first IWF decompresses voice packets received from the first location if it is determined that the second location does not use compressed voice packets.

15. The method of claim 11, wherein the second IWF compresses voice packets received from the second network switch.

16. The method of claim 11, wherein the first IWF and the second IWF comprise packet relay switches.

17. The method of claim 11, wherein the first location comprises end user equipment and a third IWF coupled to the first IWF.

18. The method of claim 11, wherein the telecommunication network comprises a plurality of IWFS, step (d) comprising the step of:

routing the connection through at least one of the plurality of IWFs.

19. A telecommunication network for carrying at least one compressed voice packet from a first location to a second location, said network comprising:

a plurality of interworking functions (IWFs);

a plurality of network switches;

a network database coupled to one or more of said network switches;

means for receiving signaling information from the first location;

means for querying said network database based on the signaling information;

means for determining whether the second location uses compressed voice packets based on the query; and means for establishing a connection between a pair of said plurality of IWFs if it is determined that the second location uses compressed voice packets, wherein said connection bypasses said plurality of network switches.

20. The telecommunication network of claim 19, wherein the compressed voice packet is carried on an Asynchronous Transfer Mode (ATM) circuit.

21. The telecommunication network of claim 20, wherein said connection comprises an ATM Adaption Layer-2 (AAL2) channel connection.

22. The telecommunication network of claim 19, wherein said plurality of IWFs comprise packet relay switches.

23. The telecommunication network of claim 19, wherein the first location comprises end user equipment coupled to an IWF.

24. The telecommunication network of claim 19, wherein said connection is a direct connection between said pair of said plurality of IWFs.

25. The telecommunication network of claim 19, wherein said connection is routed through one or more intermediate IWFs between said pair of IWFs.

26. The telecommunication network of claim 25, wherein said pair of IWFs and said one or more intermediate IWFs are each controlled by at least one of said plurality of network switches.

27. The telecommunication network of claim 25, wherein said pair of IWFs are controlled by at least one of said plurality of network switches, and said one or more intermediate IWFs are not controlled by said plurality of network switches.

28. The telecommunication network of claim 19, wherein said plurality of IWFs and said plurality of network switches are part of a Public Switched Telephone Network ("PSTN").

29. A telecommunication network for transmitting a first compressed voice packet from a first location to a second location, said network comprising:

a first path for transmitting compressed voice packets from the first location to the second location;

a second path for transmitting uncompressed voice packets from the first location to the second location;

means for transmitting the first voice packet over said first path if said second location uses compressed voice packets; and means for transmitting the first voice packet over said second path if said second location uses uncompressed voice packets.

* * * * *